(12) United States Patent
Kim

(10) Patent No.: US 8,831,769 B2
(45) Date of Patent: Sep. 9, 2014

(54) ROBOT AND METHOD OF CONTROLLING THE SAME

(75) Inventor: Jong Owan Kim, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 502 days.

(21) Appl. No.: 12/382,627

(22) Filed: Mar. 19, 2009

(65) Prior Publication Data

US 2010/0057252 A1    Mar. 4, 2010

(30) Foreign Application Priority Data

Sep. 4, 2008  (KR) .................. 10-2008-0087363

(51) Int. Cl.
*G06F 7/00*  (2006.01)
*G05B 19/4067*  (2006.01)

(52) U.S. Cl.
CPC ............................. *G05B 19/4067* (2013.01)
USPC ........... 700/213; 700/245; 700/247; 700/248; 700/253; 700/255; 700/260; 700/275; 219/54; 219/91.1; 219/121.63; 219/130.5; 250/221; 318/568.12; 318/268.13; 318/268.14; 414/751.1

(58) Field of Classification Search
CPC ............ G06F 7/00; G06F 19/00; G06F 9/00; G06F 17/00; G05B 19/42; G05B 19/414; G05B 19/48; G01S 7/40; B25J 9/12; B25J 9/22; B25J 9/00; B25J 9/04; B25J 5/00; B25J 19/00; B25J 9/02; B05B 19/00; B23K 9/10; B23K 9/12; B23K 9/95; B23K 26/20; B23K 11/10; H01J 40/14; B65H 1/00; B65G 1/133

USPC ......... 700/245, 247, 248, 253, 255, 260, 275; 219/54, 91.1, 121.63, 130.5; 250/221; 318/568.12, 568.13, 568.14; 414/751.1
See application file for complete search history.

(56) References Cited

U.S. PATENT DOCUMENTS

| | | | | |
|---|---|---|---|---|
| 4,697,979 | A | * | 10/1987 | Nakashima et al. .......... 700/247 |
| 5,210,821 | A | * | 5/1993 | Yazaki et al. ................. 700/248 |
| 5,912,540 | A | * | 6/1999 | Kosaka et al. ........... 318/568.14 |
| 6,570,118 | B2 | * | 5/2003 | Sauron et al. .................... 219/54 |

(Continued)

FOREIGN PATENT DOCUMENTS

| | | |
|---|---|---|
| JP | 05-112250 | 5/1993 |
| JP | 09-305223 | 11/1997 |

(Continued)

OTHER PUBLICATIONS

Japanese Office action issued May 1, 2013 in corresponding Japanese Patent Application 2009-088935.

(Continued)

*Primary Examiner* — James Trammell
*Assistant Examiner* — Sanjeev Malhotra
(74) *Attorney, Agent, or Firm* — Staas & Halsey LLP

(57) ABSTRACT

A robot and a method for controlling the same are provided. The robot includes a first control unit to control the overall operation of the robot and a second control unit to supplement the function of the control unit in preparation for the malfunction of the first control unit such that the second control unit controls the robot to perform a predetermined safety-considered motion when the first control unit malfunctions.

12 Claims, 10 Drawing Sheets

(56) References Cited

U.S. PATENT DOCUMENTS

| | | | |
|---|---|---|---|
| 2002/0125216 A1* | 9/2002 | Sauron et al. | 219/54 |
| 2004/0186623 A1* | 9/2004 | Dooley et al. | 700/245 |
| 2005/0055130 A1* | 3/2005 | Carlson et al. | 700/245 |
| 2005/0055132 A1* | 3/2005 | Matsumoto et al. | 700/245 |
| 2005/0096790 A1* | 5/2005 | Tamura et al. | 700/245 |
| 2005/0104548 A1* | 5/2005 | Takenaka et al. | 318/568.12 |
| 2005/0150876 A1* | 7/2005 | Menin et al. | 219/121.63 |
| 2006/0006316 A1* | 1/2006 | Takenaka | 250/221 |
| 2006/0212168 A1* | 9/2006 | Baba et al. | 700/245 |
| 2006/0241809 A1* | 10/2006 | Goswami et al. | 700/245 |
| 2007/0007262 A1* | 1/2007 | Aimi et al. | 219/130.5 |
| 2007/0075048 A1* | 4/2007 | Kunisaki et al. | 219/91.1 |
| 2007/0134082 A1* | 6/2007 | Blomgren et al. | 414/751.1 |
| 2007/0164696 A1* | 7/2007 | Henne | 318/568.13 |
| 2008/0065266 A1* | 3/2008 | Kim | 700/245 |
| 2008/0084175 A1* | 4/2008 | Hollis | 318/568.12 |
| 2008/0125908 A1* | 5/2008 | Sjoberg | 700/247 |
| 2008/0161970 A1* | 7/2008 | Adachi et al. | 700/253 |
| 2008/0188985 A1* | 8/2008 | Sakano | 700/260 |
| 2008/0234864 A1* | 9/2008 | Sugiura et al. | 700/255 |
| 2009/0259340 A1* | 10/2009 | Umemoto et al. | 700/275 |

FOREIGN PATENT DOCUMENTS

| | | |
|---|---|---|
| JP | 2000-142447 | 5/2000 |
| JP | 2006-082202 | 3/2006 |
| KR | 10-2001-0054911 | 7/2001 |
| KR | 10-2003-0094976 | 12/2003 |

OTHER PUBLICATIONS

Japanese Office Action dated Dec. 27, 2013 issued in corresponding Japanese Patent Application 2009-088935.

* cited by examiner

ROBOT AND METHOD OF CONTROLLING THE SAME

CROSS-REFERENCE TO RELATED APPLICATIONS

This application claims the benefit of Korean Patent Application No. 2008-0087363, filed on Sep. 4, 2008, in the Korean Intellectual Property Office, the disclosure of which is incorporated herein by reference.

BACKGROUND

1. Field

Embodiments of the present invention relate to a robot and a method for controlling the same, and more particularly to a robot, which has one control unit to control the overall operation of the robot and another control unit to supplement the function of the control unit, and a method of controlling the robot.

2. Description of the Related Art

In general, robots are machines, which conduct motion similar to that of a human. Initial robots were industrial robots, such as manipulators or transfer robots for the purpose of automation and unmanned operation of production. Recently, a robot, modeled on the biped walking of a human, has been researched and developed. The biped walking has disadvantages, such as instability and difficulty in pose control or walking control, compared with the quadruped or hexapod walking, but has advantages, such as more flexibly coping with an uneven surface of the ground (a rugged road) or a discontinuous walking surface (for example, stairs). In addition to such a biped robot, there are robots having various moving units, such as multi-legged robots having three legs or more and robots moving using wheels instead of feet.

The walking of a biped robot is carried out by the following process. The biped robot predetermines a walking direction, a step length, a walking speed, etc., and generates walking patterns of respective legs corresponding to the above predetermination to maintain the balance of the robot, and calculates walking trajectories of the respective legs according to the walking patterns. Further, the biped robot calculates positions of joints of the respective legs through inverse kinematics calculation of the calculated walking trajectories, and calculates target control values of motors of the respective joints based on current positions and target positions of the motors of the respective joints.

The biped walking is achieved through servo control to cause the respective legs to follow the calculated walking trajectories. Thus, it is detected whether or not the positions of the respective legs precisely follow the walking trajectories according to the walking pattern, and torques of the motors are adjusted such that the respective legs precisely follow the walking trajectories, when the respective legs are deviated from the walking trajectories.

A conventional robot includes a control unit to control the overall operation of the robot. When a software or hardware fault of the control unit occurs while the robot carries out a given instruction to perform a motion, the normal control of the robot may be impossible. The robot, which is not controlled normally, may be abnormally operated and thus destruct other peripheral structures or persons.

SUMMARY

Therefore, an aspect of embodiments of the present invention is to provide a robot, which has a first control unit to control the overall operation of the robot and a second control unit to supplement the function of the control unit in preparation for the malfunction of the first control unit such that the second control unit controls the robot to perform a predetermined safety-considered motion when the first control unit malfunctions, and a method of controlling the robot. Particularly, the safety-considered motion is limited to a relatively simple operation and a low-priced arithmetic unit having a relatively low arithmetic capability is employed as the second control unit performing the safety-considered motion, and thus expenses required to add the second control unit are cut down.

Additional aspects and/or advantages will be set forth in part in the description which follows and, in part, will be apparent from the description, or may be learned by practice of the invention.

In accordance with one aspect, embodiments of the present invention provide a robot including a first control unit controlling the robot to carry out a given instruction to perform a motion, and a second control unit controlling the robot to perform a predetermined safety-considered motion when the malfunction of the robot occurs.

The malfunction of the robot may include the malfunction of the first control unit.

The first control unit may transmit a monitoring signal to the second control unit when the robot normally operates, and the first control unit may stop the transmission of the monitoring signal to the second control unit when the robot does not normally operate.

The safety-considered motion may be a motion of the robot to stop at the current position.

The safety-considered motion may be a motion of the robot to stop at the current position and maintain its balance.

In accordance with another aspect, embodiments of the present invention provide a method for controlling a robot having a first control unit and a second control unit, including controlling the robot through the first control unit to carry out a given instruction to perform a motion, and controlling the robot through the second control unit to perform a predetermined safety-considered motion when the malfunction of the robot occurs.

The malfunction of the robot may include the malfunction of the first control unit.

The first control unit may transmit a monitoring signal to the second control unit when the robot normally operates, and the first control unit may stop the transmission of the monitoring signal to the second control unit when the robot does not normally operate.

The safety-considered motion may be a motion of the robot to stop at the current position.

The safety-considered motion may be a motion of the robot to stop at the current position and maintain its balance.

In accordance with a further aspect, embodiments of the present invention provide a robot comprising a first control unit controlling the robot in a position-based first control mode to carry out a given instruction to perform a motion, and a second control unit controlling the robot in a torque-based second control mode to perform a predetermined safety-considered motion when the malfunction of the robot occurs.

The first control mode may be a ZMP-based control mode.

The second control mode may be an FSM-based control mode.

The malfunction of the robot may include the malfunction of the first control unit.

The first control unit may control the robot respectively in the first control mode and the second control mode, and the first control unit may control the robot in at least one control mode of the first control mode and the second control mode according to the kinds of motion corresponding to the instruction, and thus carries out the instruction.

In accordance with a further aspect, embodiments of the present invention provide a method for controlling robot malfunction including controlling a robot in a normal mode to execute an inputted instruction to perform a motion when no malfunction exists, and controlling the robot in a malfunction mode to perform a predetermined safety-considered motion when a malfunction of the robot occurs.

The controlling a robot in a normal mode may further include transmitting a signal indicating that no malfunction exists.

The method for controlling a robot malfunction may further include monitoring the presence of the signal, and determining whether a malfunction of the robot has occurred based on the monitoring.

The predetermined safety-considered motion may be a motion of the robot to stop at a current position and maintain a current balance.

The controlling the robot in the malfunction mode may require less computer processing capability than controlling the robot in the normal mode.

The method for controlling a robot malfunction may further include displaying a warning to inform users of the malfunction upon determining that a malfunction has occurred.

The controlling a robot in a normal mode further includes determining a position and balance of the robot, analyzing position/torque data, and pose data of the robot, and commanding walking and gripping motions of the robot based on the determining, and analyzing.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
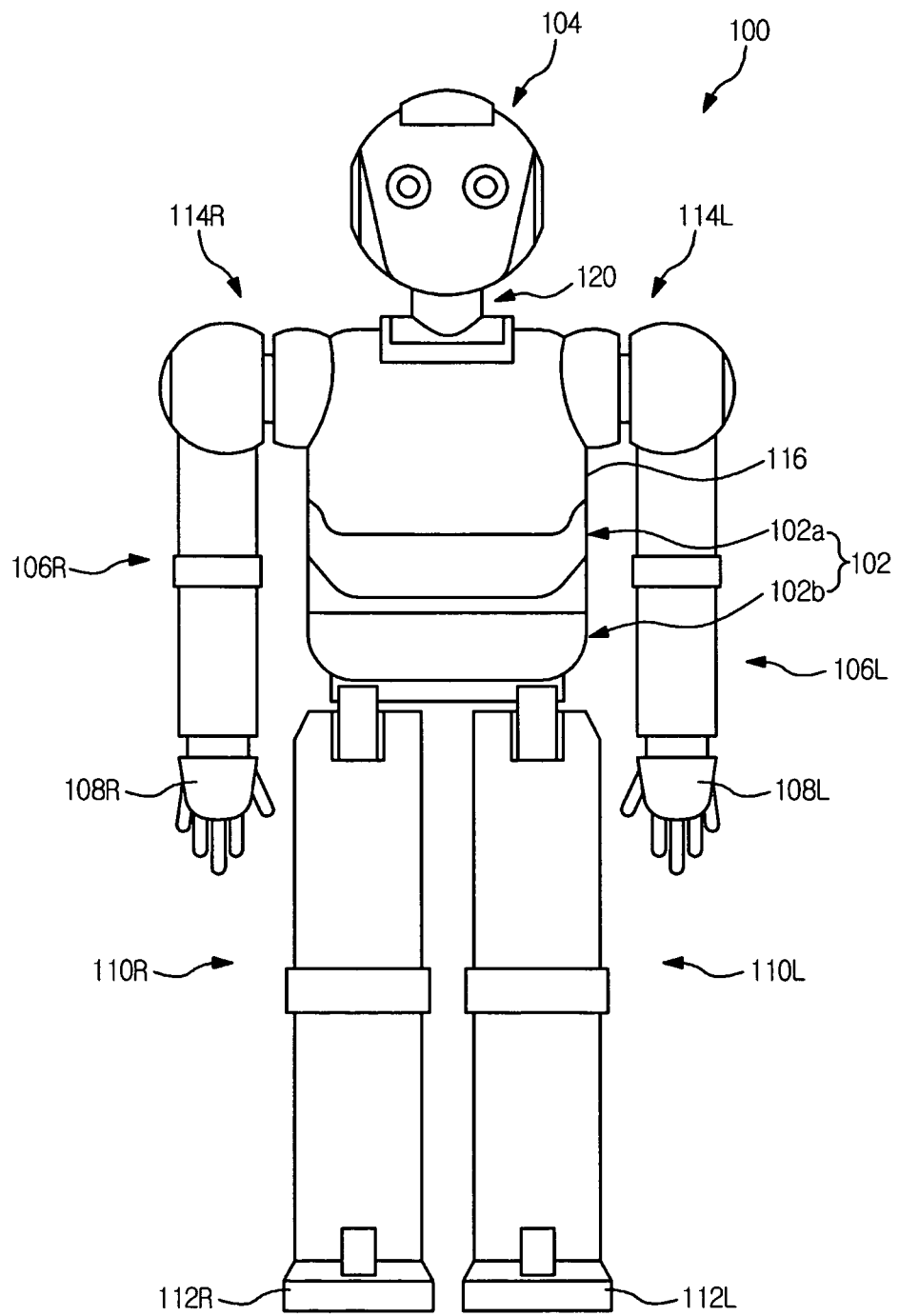
FIG. 1 illustrates a schematic view of a robot in accordance with an embodiment of the present invention.

Reference will now be made in detail to the embodiments, examples of which are illustrated in the accompanying drawings, wherein like reference numerals refer to the like elements throughout. The embodiments are described below to explain the present invention by referring to the figures.

FIG. 1 illustrates a schematic view of a robot in accordance with an embodiment of the present invention. As shown in FIG. 1, a head 104 is connected to the upper portion of a torso 102 of a robot 100 through a neck 120. Two arms 106L and 106R are connected to both sides of the upper portion of the torso 102 of the robot 100 through shoulders 114L and 114R. Hands 108L and 108R are respectively connected to tips of the two arms 106L and 106R. Two legs 110L and 110R are connected to the lower portion of the torso 102. Feet 112L and 112R are respectively connected to tips of the two legs 110L and 110R. The head 104, the two arms 106L and 106R, the two legs 110L and 110R, the two hands 108L and 108R, and the two feet 112L and 112R respectively have designated degrees of freedom through joints. The inside of the torso 102 is protected by a cover 116. The torso 102 is divided into a breast 102a and a waist 102b. Here, L represents the left side of the robot 100, and R represents the right side of the robot 100.

Figure 2:
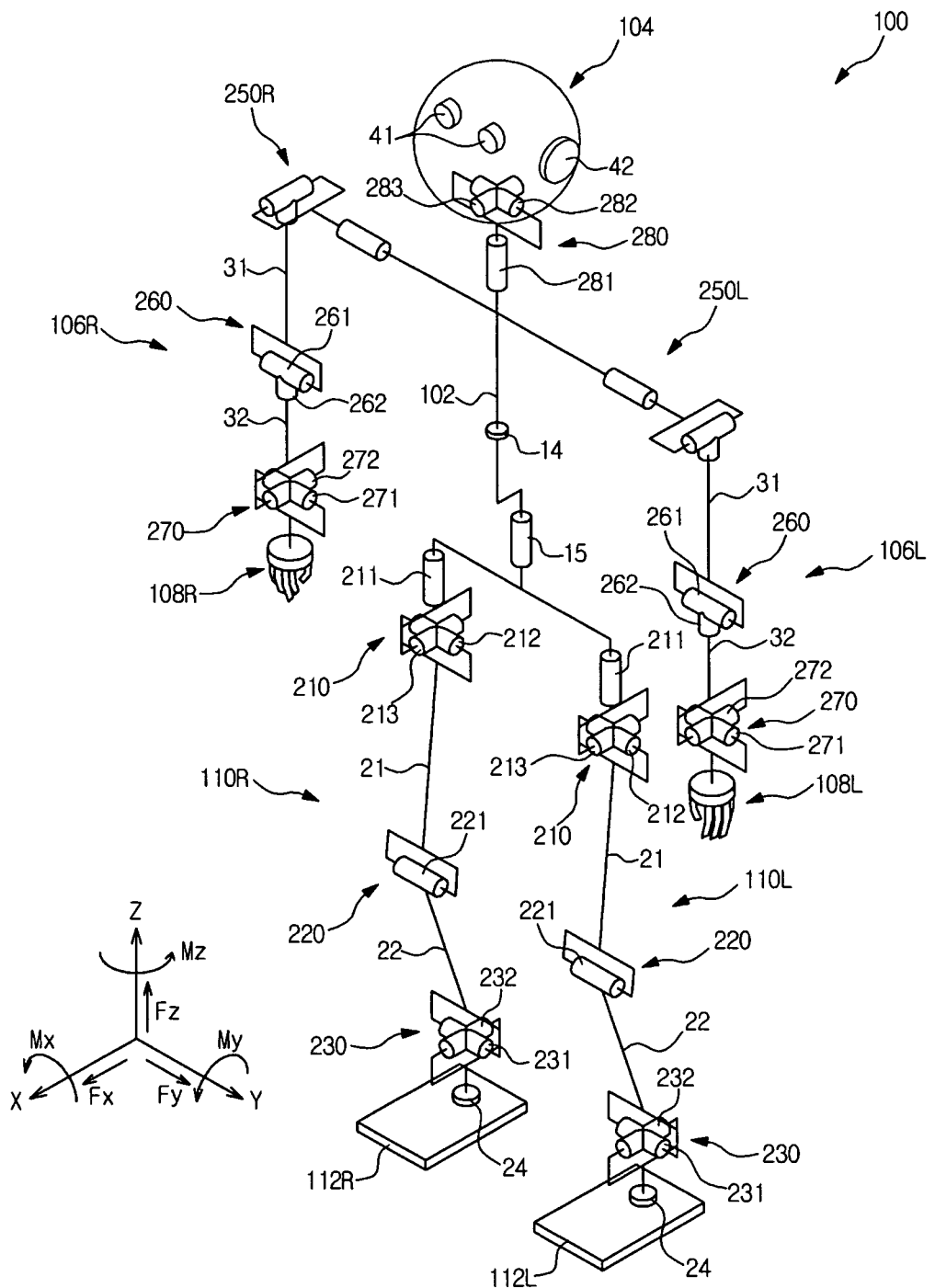
FIG. 2 illustrates a view of joint structures of the robot of FIG. 1.

FIG. 2 illustrates a view of joint structures of the robot of FIG. 1. As shown in FIG. 2, the two legs 110L and 110R of the robot 100 respectively include thigh links 21, calf links 22, and the feet 112L and 112R. The thigh links 21 are connected to the torso 102 by thigh joint units 210. The thigh links 21 and the calf links 22 are connected to each other by knee joint units 220, and the calf links 22 and the feet 112L and 112R are connected to each other by ankle joint units 230.

The thigh joint units 210 have 3 degrees of freedom. Specifically, the thigh joint units 210 respectively include rotary joints 211 in a yaw direction (in a rotating direction on the Z-axis), rotary joints 212 in a pitch direction (in a rotating direction on the Y-axis), and rotary joints 213 in a roll direction (in a rotating direction on the X-axis).

The knee joint units 220 respectively include rotary joints 221 in the pitch direction, and thus have 1 degree of freedom. The ankle joint units 230 respectively include rotary joints 231 in the pitch direction and rotary joints 232 in the roll direction, and thus have 2 degrees of freedom.

Since the two legs 110L and 110R respectively include six rotary joints of three joint units 210, 220 and 230, as described above, the two legs 110L and 110R totally include twelve rotary joints.

Multi-axis force and torque (F/T) sensors 24 are respectively installed between the feet 112L and 112R and the ankle joint units 230 of the two legs 110L and 110R. The multi-axis F/T sensors 24 measure three-directional components (Mx, My, Mz) of torque and three-directional components (Fx, Fy, Fz) of force transmitted from the feet 112L and 112R, and thus detect whether or not the legs 112L and 112R land and also detect a load applied to the feet 112L and 112R.

Cameras 41 serving as eyes of the robot 100 and microphones 42 serving as ears of the robot 100 are installed on the head 104. The head 104 is connected to the torso 102 by a neck joint unit 280. The neck joint unit 280 includes a rotary joint 281 in the yaw direction, a rotary joint 282 in the pitch direction, and a rotary joint 283 in the roll direction, and thus has 3 degrees of freedom. Motors (not shown) for rotating the head 104 are respectively connected to the rotary joints 281, 282, and 293 of the neck joint unit 280.

Shoulder joint assemblies 250L and 250R are installed at both sides of the torso 102, and connect the two arms 106L and 106R to the torso 102. The two arms 106L and 106R respectively include upper arm links 31, lower arm links 32, and the hands 108L and 108R. The upper arm links 31 are connected to the torso 102 by the shoulder joint assemblies 250L and 250R. The upper arm links 31 and the lower arm links 32 are connected to each other by elbow joint units 260, and the lower arm links 32 and the hands 108L and 108R are connected to each other by wrist joint units 270. The elbow joint units 260 respectively include rotary joints 261 in the pitch direction and rotary joints 262 in the yaw direction, and thus have 2 degrees of freedom. The wrist joint units 270 respectively include rotary joints 271 in the pitch direction and rotary joints 272 in the roll direction, and thus have 2 degrees of freedom.

A pose sensor 14 is installed on the torso 102. The pose sensor 14 detects a tilt angle of the pose 102 to a perpendicular axis and its angular velocity, and generates pose data. The pose sensor 14 may be installed on the head 104 as well as the torso 102. Further, a rotary joint 15 in the yaw direction to rotate the breast 102a (FIG. 1) against the waist 102b (FIG. 1) is installed between the breast 102a (FIG. 1) and the waist 102b (FIG. 1) of the torso 102.

Although not shown in the drawings, motors to respectively drive the rotary joints are installed on the robot 100. A control unit, which controls the overall operation of the robot 100, properly controls the motors, thus allowing the robot 100 to perform various motions.

Figure 3:
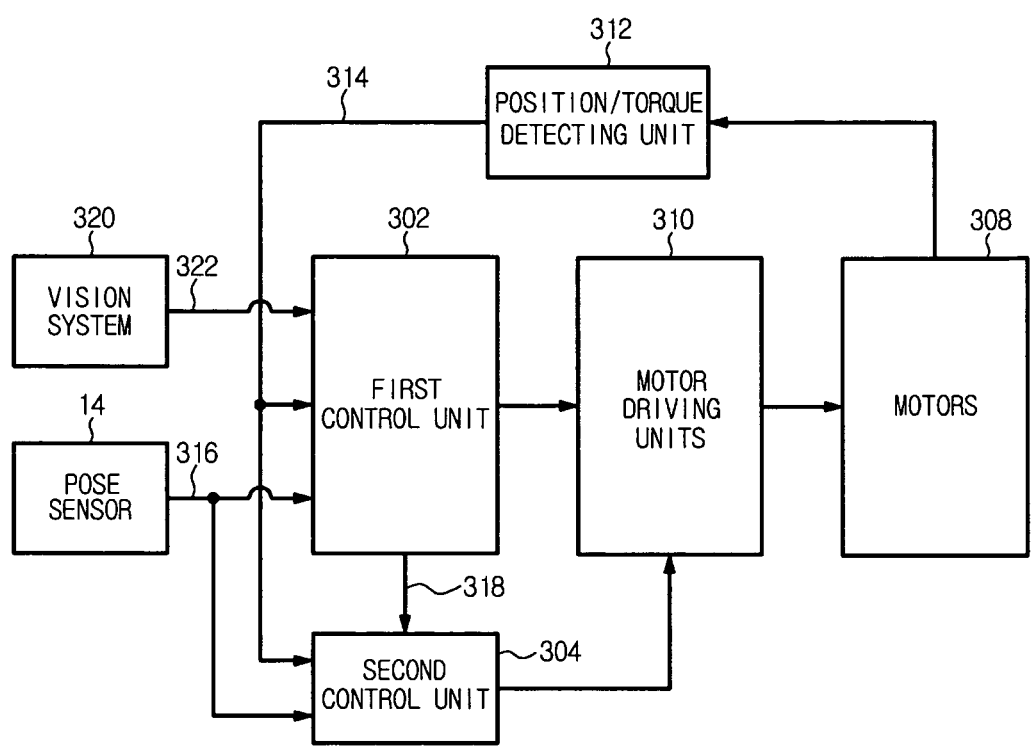
FIG. 3 illustrates a view of a control system of a robot in accordance with an embodiment of the present invention.

FIG. 3 illustrates a view of a control system of a robot in accordance with a an embodiment of the present invention. As shown in FIG. 3, the robot 100 (FIG. 1) in accordance with the an embodiment of the present invention includes a first control unit 302 and a second control unit 304. The first control unit 302 controls the overall operation of the robot 100 and carries out a given instruction to perform a motion. The second control unit 304 controls the robot 100 such that the robot 100 performs a predetermined safety-considered motion, when the first control unit 302 malfunctions.

A vision system 320, the pose sensor 14, and a position/torque detecting unit 312 are communicably connected to the input side of the first control unit 302. Motors 308 to respectively move the joints of the robot 100 (FIG. 1) and motor driving units 310 to respectively drive the motors 308 are communicably connected to the output side of the first control unit 302. Several motors 308 and motor driving units 310 may be provided according to the number and structures of the joints. The pose sensor 14 and the position/torque detecting unit 312 are communicably connected to the input side of the second control unit 304. The motors 308 to respectively move the joints of the robot 100 (FIG. 1) and the motor driving units 310 to respectively drive the motors 308 are communicably connected to the output side of the second control unit 304.

The first control unit 302 generates a heartbeat signal 318, and transmits the heartbeat signal 318 to the second control unit 304. The heartbeat signal 318 is a monitoring signal, which is periodically generated while the first control unit 302 normally controls the overall operation of the robot 100 and thus serves to inform that the first control unit 302 normally operates. In case that the first control unit 302 cannot normally control the robot 100 due to a software or hardware fault, the generation of the heartbeat signal 318 is stopped. The second control unit 304, which monitors the generation of the heartbeat signal 318, determines that the normal control of the robot 100 through the first control unit 302 is impossible, when the generation of the heartbeat signal 318 is stopped, and controls the robot 100 such that the robot 100 performs a predetermined safety-considered motion.

The position/torque detecting unit 312 detects positions and torques of the motors 308, and supplies position/torque data 314 to the first control unit 302 and the second control unit 304. The pose sensor 14 generates pose data 316 of the robot 100 (FIG. 1). The first control unit 302 and the second control unit 304 generate a walking pattern using the position/torque data 314 of the motors 308 and the pose data 316 of the robot 100, and control the walking of the robot 100 (FIG. 1) according to the walking pattern.

The first control unit 302 controls the overall operation of the robot 100 (FIG. 1) in accordance with an embodiment of the present invention. That is, the first control unit 302 confirms the position of the robot 100 (FIG. 1) and prepares a surrounding map using image data 322 supplied from the vision system, analyzes the position/torque data 314 of the respective motors 308 of the robot 100 (FIG. 1) supplied from the position/torque detecting unit 312 and the pose data 316 of the robot 100 (FIG. 1) supplied from the pose sensor 14, and thus controls the walking and gripping motions of the robot 100 (FIG. 1). In the control of the operation of the robot 100 (FIG. 1) using the position/torque data 314 and the pose data 316, the amount of data to be processed to confirm the position of the robot 100 (FIG. 1) and prepare the surrounding map through the analysis of a surrounding image obtained through the vision system 320 is massive, and the massive amount of the data must be processed in real time during the operation of the robot 100 (FIG. 1). Thus, an arithmetic unit having a high processing capability needs to be employed as the first control unit 302. In order to have the high processing capability, an arithmetic unit is based on a specific design and an advanced technique, and thus is expensive compared with other arithmetic units having a relatively low processing capability.

Referring to FIGS. 1 and 3, the second control unit 304 controls the robot 100 such that the robot 100 stops carrying out the given instruction and performs a predetermined safety-considered motion, when the first control unit 302 cannot normally control the robot 100 due to a software or hardware fault. As an example of the safety-considered motion, in case that the robot 100 moves, the robot 100 stops at the current position and maintains an upright pose without losing its balance. As another example of safety-considered motion, the robot 100 stops at the current position and maintains an upright pose without losing its balance. As another example of safety-considered motion, in the case where separate charging equipment to charge the robot 100 is installed, the robot 100 moves to the charging equipment and is electrically connected to the charging equipment. Preferably, the robot 100 gets into various poses according to the structure and shape of the robot 100 such that persons or structures around the robot 100 can maintain their safety. In order to allow the robot 100 to perform the safety-considered motion, the second control unit 304 performs only control having a relatively low level, such as (i) stopping at the current position and (ii) sitting down at the current position without losing its balance or maintaining its upright pose. Therefore, the second control unit 304 has a relatively small data processing throughput, compared with the first control unit 302, and thus employs a low-priced arithmetic unit having a relatively low processing speed.

As described above, the second control unit 304 is a backup arithmetic unit, which is temporarily used in an emergency when the malfunction of the first control unit 302 occurs. Since the second control unit 304 employs a relatively low-priced arithmetic unit having a low processing capability, while the first control unit 302 employs an expensive high-performance arithmetic unit, the robot of embodiments of the present invention has a stable backup arithmetic unit at a relatively low price, compared with a case that an expensive arithmetic unit having the same performance as that of the first control unit 302 is used as a backup arithmetic unit, and thus secures advantageous price competitiveness. Further, when an arithmetic unit having a relatively low processing capability is used, a design for the arithmetic unit is simple and the maintenance and renewal costs of the arithmetic unit are highly reduced.

Figure 4:
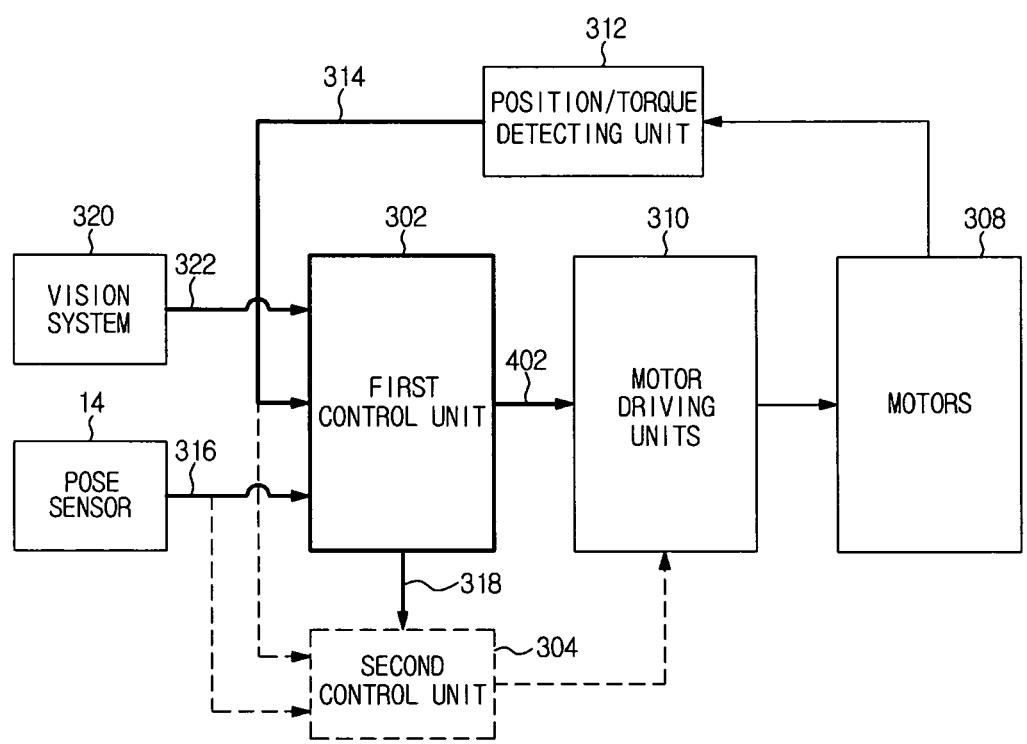
FIG. 4 illustrates a view of the control system for general motion of the robot of FIG. 3.

FIG. 4 illustrates a view of the control system for general motion of the robot of FIG. 3. As shown in FIG. 4, while the first control unit 302 normally operates and generates the heartbeat signal 318 periodically, the position/torque data 314 from the position/torque detecting unit 312, the pose data 316 from the pose sensor 14, and image data 322 from the vision system 320 are inputted to the first control unit 302, and the first control unit 302 generates a control signal 402 causing the robot 100 (FIG. 1) to carry out a given instruction to perform a motion based on these data. At this time, the second control unit 304 monitors whether or not the heartbeat signal 318 is normally generated from the first control unit 302, and does not participate in the control of the robot 100 (FIG. 1).

Figure 5:
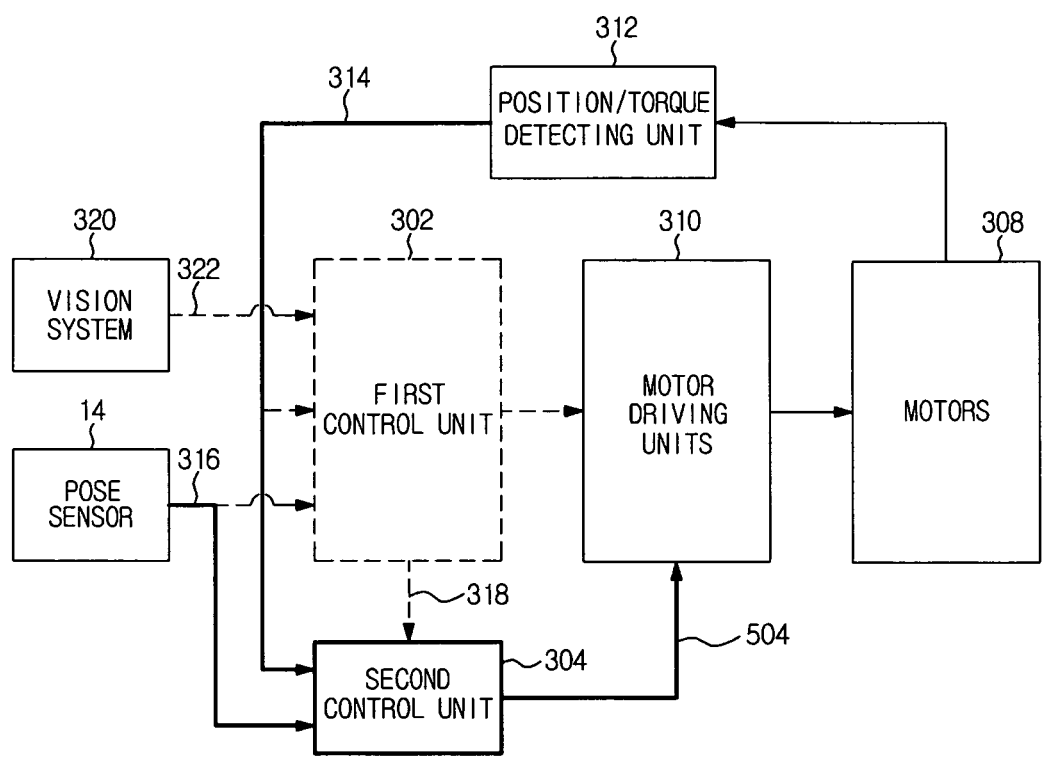
FIG. 5 illustrates a view of the control system for safety-considered motion of the robot of FIG. 3.

FIG. 5 illustrates a view of the control system for safety-considered motion of the robot of FIG. 3. As shown in FIG. 5, when the first control unit 302 malfunctions and does not normally generate the heartbeat signal 318, the second control unit 304 generates a control signal 504 causing the robot 100 (FIG. 1) to perform a predetermined safety-considered motion based on the position/torque data 314 from the position/torque detecting unit 312 and the pose data 316 from the pose sensor 14. Here, the control signal 504 generated from the second control unit 304 is limited to a signal causing the robot 100 to stop the performing motion and perform the safety-considered motion. Thus, the second control unit 304 does not need an arithmetic capability of a high level more than a level causing the robot 100 (FIG. 1) to perform the safety-considered motion. In case that the predetermined safety-considered motion is a motion, which is very simple and relatively easily achieved, the second control unit 304 generates a control signal, as programmed in advance, without using the position/torque data 314 and the pose data 316, and thus controls the robot 100 such that the robot 100 can perform the safety-considered motion. In this case, the second control unit 304 may have a very low arithmetic capability, and thereby a cost required to manufacture the second control unit 304 is more lowered.

Figure 6:
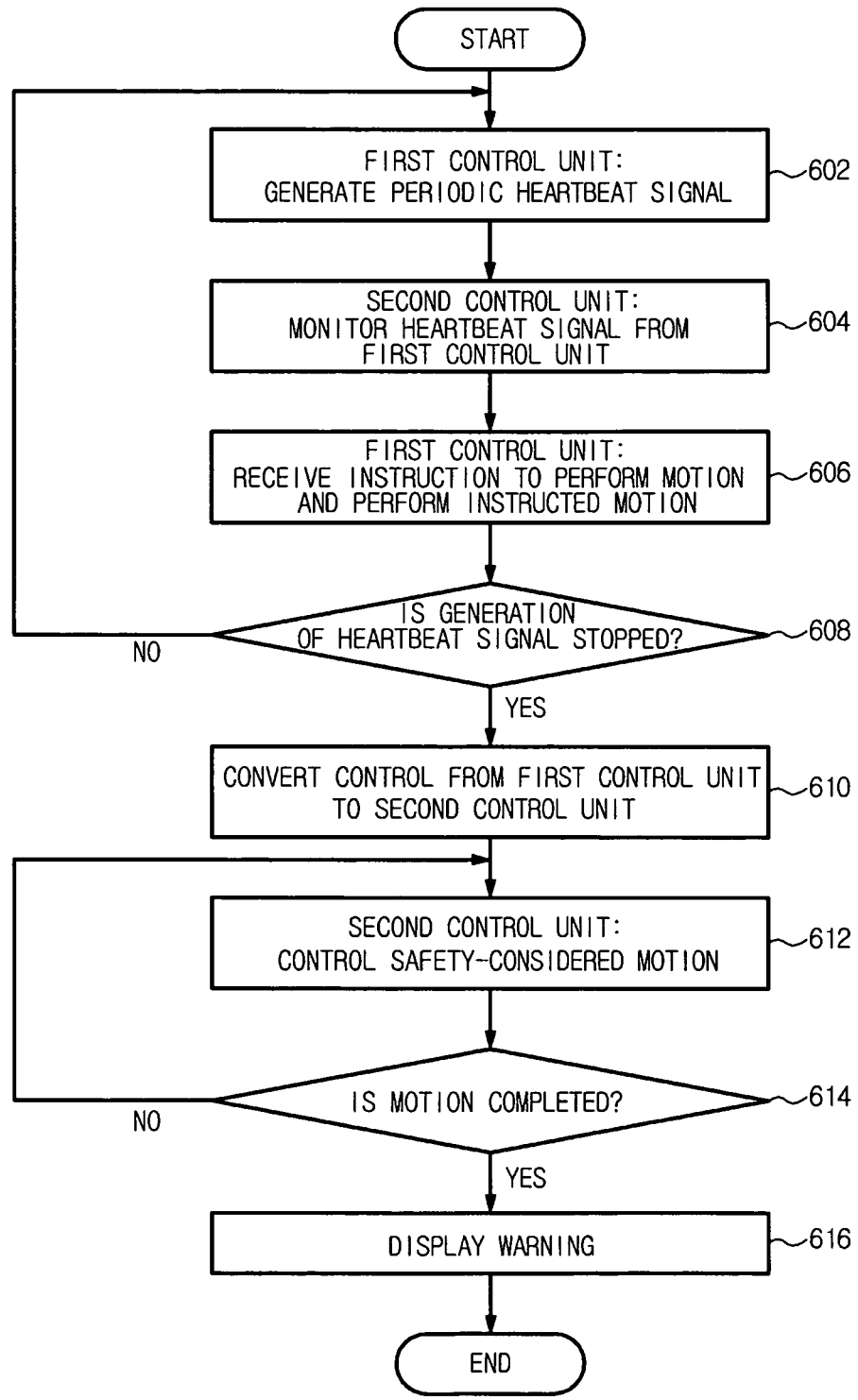
FIG. 6 illustrates a flow chart of a method of controlling a robot in accordance with an embodiment of the present invention.

FIG. 6 illustrates a flow chart of a method of controlling the robot in accordance with an embodiment of the present invention. As shown in FIGS. 4 and 6, in operation 602, the first control unit 302 periodically generates the heartbeat signal 318 during the normal operation of the first control unit 302. In operation 604, the second control unit 304 monitors whether or not the heartbeat signal 318 is normally generated from the first control unit 302.

In operation 606, the first control unit 302 receives an instruction to perform a motion from outside of the robot 100 (FIG. 1), and performs the instructed motion. In operation 608, it is determined whether the first control unit 302 malfunctions and stops the generation of the heartbeat signal 318, and if the second control unit 304 recognizes the stoppage of the generation of the heartbeat signal 318 from the first control unit 302, the "YES" path is followed, and in operation 610, control of the robot 100 is converted from the first control unit 302 to the second control unit 304. If it is determined that the generation of the heartbeat signal has not stopped, the "NO" path of operation 608 is followed, and operation 602 is next performed. The exclusion of the first control unit 302 from the control subject is achieved by several methods, such as a method of cutting off the position/torque data 314, the pose data 316, and the image data 322 so as not to be inputted to the first control unit 302, a method of cutting off the control signal 402 generated from the first control unit 302 so as not to be transmitted to the motor driving units 310, and a method of cutting off the power supply to the first control unit 302.

When data is converted from the first control unit 302 to the second control unit 304, in operation 612, the second control unit 304 having the authority to control the robot 100 (FIG. 1) controls the robot 100 such that the robot 100 performs a predetermined safety-considered motion. In operation 614, it is determined whether the robot 100 (FIG. 1) has performed the predetermined safety-considered motion. Upon determining that the robot 100 (FIG. 1) has completed the motion, the "YES" path of operation 614 is followed, and in operation 616, the second control unit 304 displays a warning to inform a user or administrator of the robot 100 or persons around the robot 100 of the malfunction of the first control unit 302 of the robot 100. Methods for displaying the warning include the lighting of a lamp, the output of a text to a display unit, and the generation of a warning sound through a speaker. If it is determined that the robot 100 (FIG. 1) has not completed the motion, the "NO" path of operation 614 is followed, and the second control unit 304 continues to control the robot 100 in operation 612.

Figure 7:
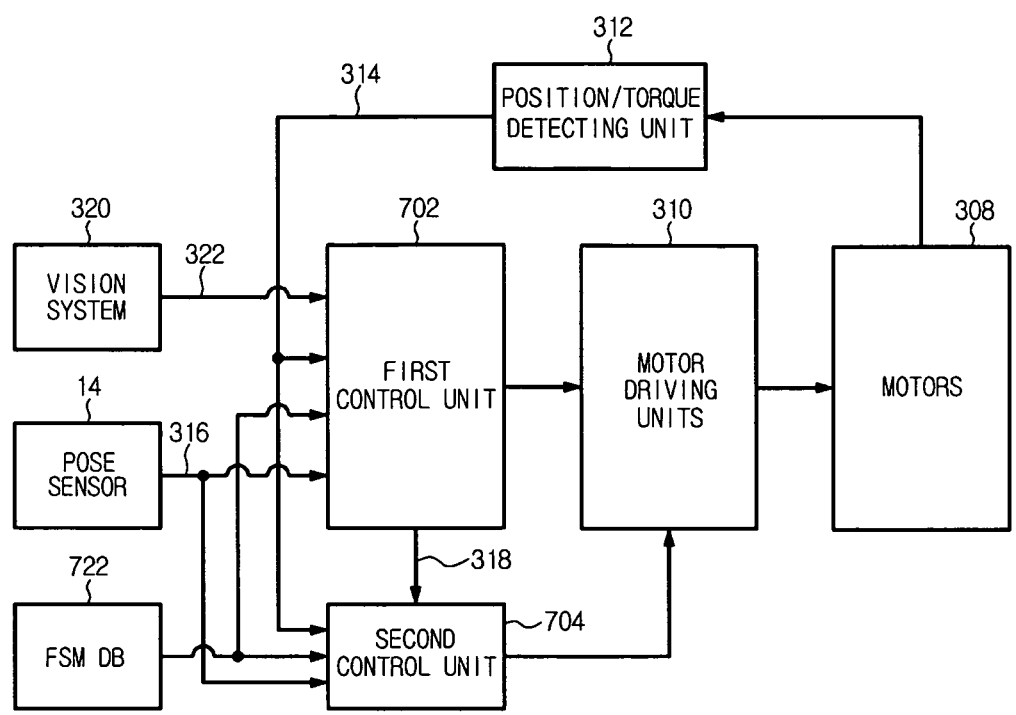
FIG. 7 illustrates a view of a control system of a robot in accordance with an embodiment of the present invention.

FIG. 7 illustrates a view of a control system of a robot in accordance with an embodiment of the present invention. As shown in FIG. 7, the robot 100 (FIG. 1) in accordance with an embodiment of the present invention includes a first control unit 702 and a second control unit 704. The first control unit 702 controls the overall operation of the robot 100 and carries out a given instruction to perform a motion. The second control unit 704 controls the robot 100 (FIG. 1) such that the robot 100 performs a predetermined safety-considered motion when the first control unit 702 malfunctions.

A vision system 320, a pose sensor 14, a position/torque detecting unit 312, and a finite state machine (FSM) database 722 are communicably connected to the input side of the first control unit 702. Motors 308 to respectively move the joints of the robot 100 and motor driving units 310 to respectively drive the motors 308 are communicably connected to the output side of the first control unit 702. Several motors 308 and motor driving units 310 may be provided according to the number and structures of the joints. The pose sensor 14, the position/torque detecting unit 312, and the FSM database 722 are communicably connected to the input side of the second control unit 704. The motors 308 to respectively move the joints of the robot 100 (FIG. 1) and the motor driving units 310 to respectively drive the motors 308 are communicably connected to the output side of the second control unit 704.

Referring to FIGS. 1 and 7, in an embodiment of the present invention, the first control unit 702 selects any one of an FSM-based control mode and a zero moment point (ZMP)-based control mode according to a given instruction to perform a motion and conditions for the motion, and controls the robot 100 based on the selected control mode. The FSM-based control mode is a torque-based control mode and the ZMP-based control mode is a position-based control mode. In the FSM-based control mode, states (here, states mean states in the finite state machines) of the respective motions of the robot 100 are defined in advance, and the robot 100 properly walks with reference to the states of the respective motions while walking. In the ZMP-based control mode, the robot 100 predetermines a walking direction, a step length, a walking speed, etc., generates walking patterns of respective legs corresponding to the above predetermination, and calculates walking trajectories of the respective legs according to the walking patterns. Further, in case that the robot 100 performs biped walking, the robot 100 calculates positions of joints of the respective legs through inverse kinematics calculation of the calculated walking trajectories, and calculates target control values of motors of the respective joints based on current positions and target positions of the motors of the respective joints. Further, this process is achieved through servo control to cause the respective legs to follow the calculated walking trajectories. Thus, it is detected whether or not the positions of the respective legs precisely follow the walking trajectories according to the walking patterns, and torques of the motors are controlled such that the respective legs precisely follow the walking trajectories, when the respective legs are deviated from the walking trajectories.

The first control unit 702 selects the FSM-based control mode to control a moving (walking) of the robot 100 on the even surface of land or a comparatively simple motion (walking) of the robot 100. On the other hand, the first control unit 702 selects the ZMP-based walking control in case that a step length is designated due to the rough surface of land, such as stairs, or an obstacle or control of a precise motion of the whole body of the robot 100, such as opening a door or shifting an object, is required. The second control unit 704 carries out the FSM-based control mode to cause the robot 100 to perform a safety-considered motion when the first control unit 702 malfunctions. Since the FSM-based control mode has fewer calculations, compared with the ZMP-based control mode, and follows a sequence, which is programmed in advance, the second control unit 704 employs a relatively low-priced arithmetic unit having a low arithmetic capability.

The first control unit 702 generates a heartbeat signal 318, and transmits the heartbeat signal 318 to the second control unit 704. The heartbeat signal 318 is a monitoring signal, which is periodically generated while the first control unit 702 normally controls the overall operation of the robot 100 and thus serves to inform that the first control unit 702 normally operates. In case that the first control unit 702 cannot normally control the robot 100 due to a software or hardware fault, the generation of the heartbeat signal 318 is stopped. The second control unit 704, which monitors the generation of the heartbeat signal 318, determines that the normal control of the robot 100 through the first control unit 702 is impossible, when the generation of the heartbeat signal 318 is stopped, and controls the robot 100 such that the robot 100 performs a predetermined safety-considered motion.

The position/torque detecting unit 312 detects positions and torques of the motors 308, and supplies position/torque data 314 to the first control unit 702 and the second control unit 704. The pose sensor 14 generates pose data 316 of the robot 100. The FSM database 722 stores data of states of respective motions of the robot 100, which are defined in advance, particularly data of states of safety-considered motions in advance. The first control unit 702 and the second control unit 704 generate a walking pattern using the position/torque data 314 of the motors 308 and the pose data 316 of the robot 100, and control the walking of the robot 100 according to the walking pattern.

Figure 8:
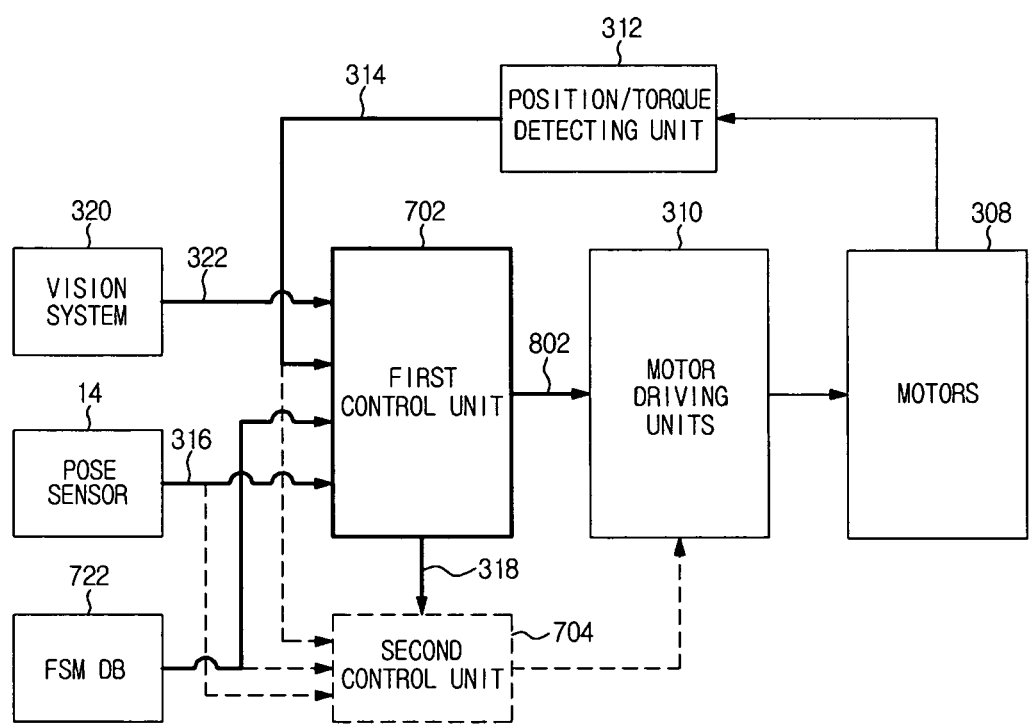
FIG. 8 illustrates a view of the control system for general motion of the robot of FIG. 7.

FIG. 8 illustrates a view of the control system for general motion of the robot of FIG. 7. As shown in FIG. 8, while the first control unit 702 normally operates and generates the heartbeat signal 318 periodically, the position/torque data 314 from the position/torque detecting unit 312, the pose data 316 from the pose sensor 14, and image data 322 from the vision system 320 are inputted to the first control unit 702, and the first control unit 702 generates a control signal 702 causing the robot 100 (FIG. 1) to carry out a given instruction to perform a motion based on these data. This control signal 702 is a ZMP-based control signal or an FSM-based control signal. At this time, the second control unit 704 monitors whether or not the heartbeat signal 318 is normally generated from the first control unit 702, and does not participate in the control of the robot 100.

Figure 9:
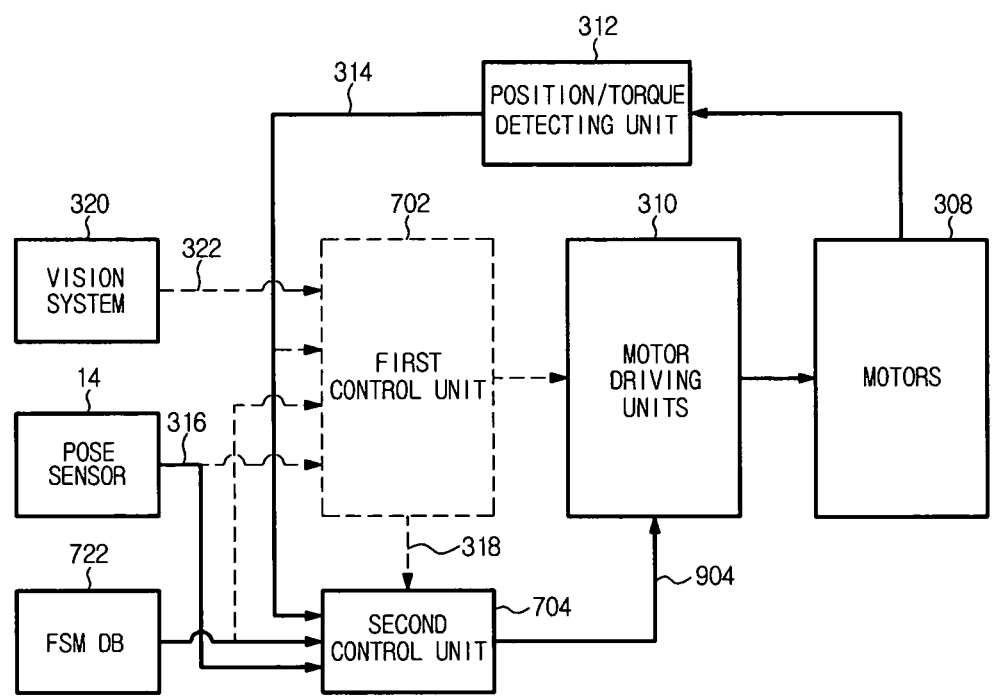
FIG. 9 illustrates a view of the control system for safety-considered motion of the robot of FIG. 7.

FIG. 9 illustrates a view of the control system for safety-considered motion of the robot of FIG. 7. As shown in FIG. 9, when the first control unit 702 malfunctions and does not normally generate the heartbeat signal 318, the second control unit 704 generates a control signal 904 causing the robot 100 (FIG. 1) to perform a predetermined safety-considered motion through the FSM-based control. If necessary, the second control unit 704 may refer to the position/torque data 314 from the position/torque detecting unit 312 and the pose data 316 from the pose sensor 14. The control signal 904 generated from the second control unit 704 is limited to the stoppage of the performing motion and the performance of the safety-considered motion. Thus, the second control unit 704 does not need an arithmetic capability of a high level more than a level causing the robot 100 to perform the safety-considered motion. Since the FSM-based control mode does not require a high arithmetic capability, the second control unit 704 may have a low arithmetic capability, and thereby a cost required to manufacture the second control unit 704 is more lowered.

Figure 10:
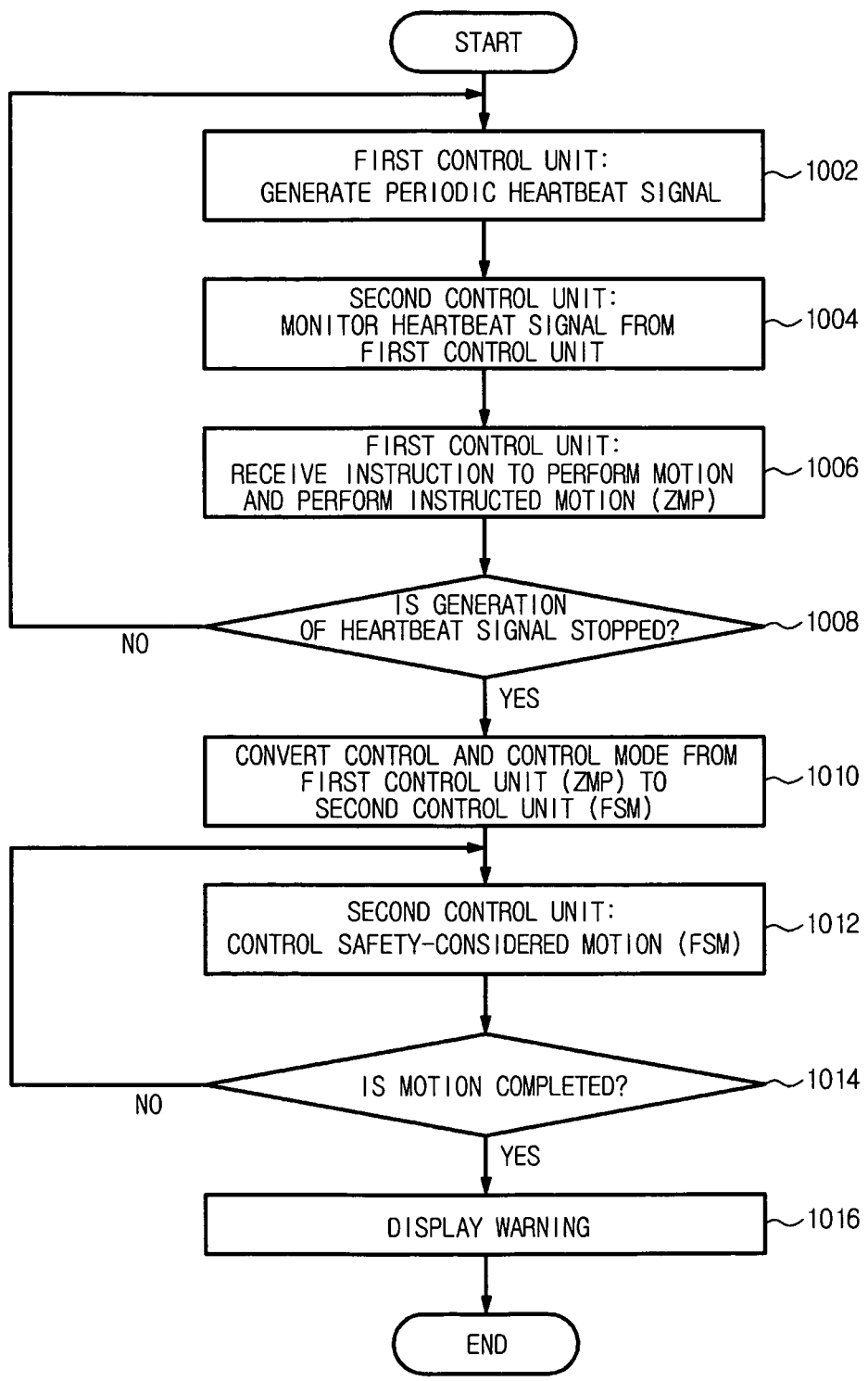
FIG. 10 illustrates a flow chart of a method of controlling a robot in accordance with an embodiment of the present invention.

FIG. 10 illustrates a flow chart of a method of controlling the robot in accordance with an embodiment of the present invention. As shown in FIGS. 8 and 10, in operation 1002, the first control unit 702 periodically generates the heartbeat signal 318 during the normal operation of the first control unit 702. In operation 1004, the second control unit 704 monitors whether or not the heartbeat signal 318 is normally generated from the first control unit 702).

In operation 1006, the first control unit 702 receives an instruction to perform a motion from the outside, and performs the instructed corresponding motion through the ZMP-based control. If necessary, the first control unit 702 may perform the instructed motion through the FSM-based control. If it is determined in operation 1008 that the first control unit 702 malfunctions and stops the generation of the heartbeat signal 318, the second control unit 704 recognizes the stoppage of the generation of the heartbeat signal 318 from the first control unit 702, then the "YES" path of operation 1008 is followed, and in operation 1010, the control of the robot 100 (FIG. 1) is converted from the first control unit 702 to the second control unit 704 and the control mode is converted from the ZMP-based control mode to the FSM-based control mode. If it is determined that the generation of the heartbeat signal has not stopped, the "NO" path of operation 1008 is followed, and operation 1002 is next performed. The exclusion of the first control unit 702 from the control subject is achieved by several methods, such as a method of cutting off the position/torque data 314, the pose data 316, and the image data 322 so as not to be inputted to the first control unit 702, a method of cutting off the control signal 802 generated from the first control unit 702 so as not to be transmitted to the motor driving units 310, and a method of cutting off the power supply to the first control unit 702.

In operation 1012, when the control subject is converted from the first control unit 702 to the second control unit 704, the second control unit 704 having the authority to control the robot 100 controls the robot 100 such that the robot 100 performs a predetermined safety-considered motion through the FSM-based control. Upon determining in operation 1014 that the robot 100 (FIG. 1) performs the safety-considered motion, the "YES" path of operation 1014 is followed, and in operation 1016, the second control unit 704 displays a warning to inform a user or administrator of the robot 100 or persons around the robot 100 of the malfunction of the first control unit 702 of the robot 100. Methods for displaying the warning include the lighting of a lamp, the output of a text to a display unit, and the generation of a warning sound through a speaker. If it is determined in operation 1014 that the robot 100 (FIG. 1) has not completed the motion, the "NO" path of operation 1014 is followed, and the second control unit 704 continues to control the robot 100 in operation 1012.

Although embodiments of the invention have been shown and described, it would be appreciated by those skilled in the art that changes may be made in these embodiments without departing from the principles and spirit of the invention, the scope of which is defined in the claims and their equivalents.

What is claimed is:

1. A robot comprising:
    a first control unit controlling the robot to carry out a given instruction to perform a motion; and
    a second control unit controlling the robot to perform a predetermined safety-considered motion when a malfunction of the robot occurs,
    wherein the second control unit is a backup unit having a lower processing capability than the first control unit, the second control unit being temporarily used when the malfunction of the first control unit occurs and does not participate in controlling the robot when the first control unit normally operates.

2. The robot according to claim 1, wherein the malfunction of the robot includes a malfunction of the first control unit.

3. The robot according to claim 1, wherein:
    the first control unit transmits a monitoring signal to the second control unit when the robot normally operates; and
    the first control unit stops transmission of the monitoring signal to the second control unit when the robot does not normally operate.

4. The robot according to claim 1, wherein the predetermined safety-considered motion is a motion of the robot to stop at a current position of the robot.

5. The robot according to claim 1, wherein the predetermined safety-considered motion is a motion of the robot to stop at a current position of the robot and maintain a balance of the robot.

6. The robot according to claim 1, wherein the predetermined safety-considered motion is a motion of the robot to stop at a current position of the robot and sit down at the current position without losing its balance or maintaining an upright pose.

7. A method for controlling a robot having a first control unit and a second control unit, comprising:
    controlling the robot through the first control unit to carry out a given instruction to perform a motion; and
    controlling the robot through the second control unit to perform a predetermined safety-considered motion when a malfunction of the robot occurs,
    wherein the second control unit is a backup unit having a lower processing capability than the first control unit, the second control unit being temporarily used when the malfunction of the first control unit occurs and does not participate in controlling the robot when the first control unit normally operates.

8. The method according to claim 7, wherein the malfunction of the robot includes a malfunction of the first control unit.

9. The method according to claim 7, wherein:
    the first control unit transmits a monitoring signal to the second control unit when the robot normally operates; and
    the first control unit stops transmission of the monitoring signal to the second control unit when the robot does not normally operate.

10. The method according to claim 7, wherein the predetermined safety-considered motion is a motion of the robot to stop at the current position.

11. The method according to claim 7, wherein the predetermined safety-considered motion is a motion of the robot to stop at a current position of the robot and maintain a balance of the robot.

12. The method according to claim 7, wherein the predetermined safety-considered motion is a motion of the robot to stop at the current position of the robot and sit down at the current position without losing its balance or maintaining an upright pose.

* * * * *